April 23, 1963

C. G. GORDON 3,086,551

HYDRAULIC RELIEF VALVES

Filed March 13, 1961

INVENTOR.
CARROLL G. GORDON
BY
O'BRIAN & BLACKHAM
ATTORNEYS

United States Patent Office 3,086,551
Patented Apr. 23, 1963

3,086,551
HYDRAULIC RELIEF VALVES
Carroll G. Gordon, Menlo Park, Calif., assignor of one-half to William F. Stoesser, Mountain View, Calif.
Filed Mar. 13, 1961, Ser. No. 95,259
2 Claims. (Cl. 137—514.5)

This invention pertains to new and improved hydraulic relief valves.

Valves of this type are utilized in conjunction with a source of hydraulic fluid under pressure in a hydraulic system in order to prevent the pressure of hydraulic fluid in such a system from exceeding a predetermined value. In the usual circumstance such a source of hydraulic fluid under pressure is a pump, and the capacity of such a pump normally exceeds the total amount of fluid flow within the system with which it is utilized. With this type of complete system the relief valve employed serves to convey the amount of hydraulic fluid from the pump in excess of the system demands to a return reservoir or the like from which such fluid is normally available to the inlet of the pump employed.

A number of different relief valve type structures have been developed and used for controlling the pressure of hydraulic fluid within a complete hydraulic system. It is believed that the vast majority of such prior valve structures employed for this purpose have been in the nature of common spring loaded check valves. Thus, many of these prior structures have been built so as to include a valve body or plunger which is normally biased by means of a spring against a valve seat located between a pressure passage and a return passage. While this type of structure is unquestionably capable of being used for relief valve purposes, it is not considered completely satisfactory for this type of application because of the manner in which a valve body or plunger operates when this type of valve is used for relief valve purposes.

Since the output capacity of a pump used with a normal hydraulic system is greater than the system flow, in a conventional relief valve in such a system the valve body or plunger is rarely at rest. Instead such a body or plunger moves back and forth in a practically continuous manner so that the orifice area in the valve through which hydraulic fluid under pressure moves is varied. As a consequence of this in the conventional type of relief valve it is difficult to maintain adequate control of the movement of the plunger or valve body. This, in turn, affects performance. This is evidenced by the fact that conventional relief valves are noted for so-called "chattering" which occurs as they are utilized.

An object of the present invention is to provide hydraulic relief valves which overcome many of the disadvantages and limitations of prior relief valve structures such as are briefly discussed in the preceding. A further object of the present invention is to provide hydraulic relief valves which include means for dampening or stabilizing the forces acting upon a valve body or plunger within one of these valves so as to achieve effective control of the movement of such a valve body or plunger. A further object of the present invention is to provide new and improved hydraulic relief valves which are comparatively simple and inexpensive to manufacture, and which perform reliably when utilized.

These and various other objects of this invention as well as many specific advantages of it will be more fully apparent from a detailed consideration of the remainder of this specification, the appended claims and the accompanying drawing in which:

Figure 1:
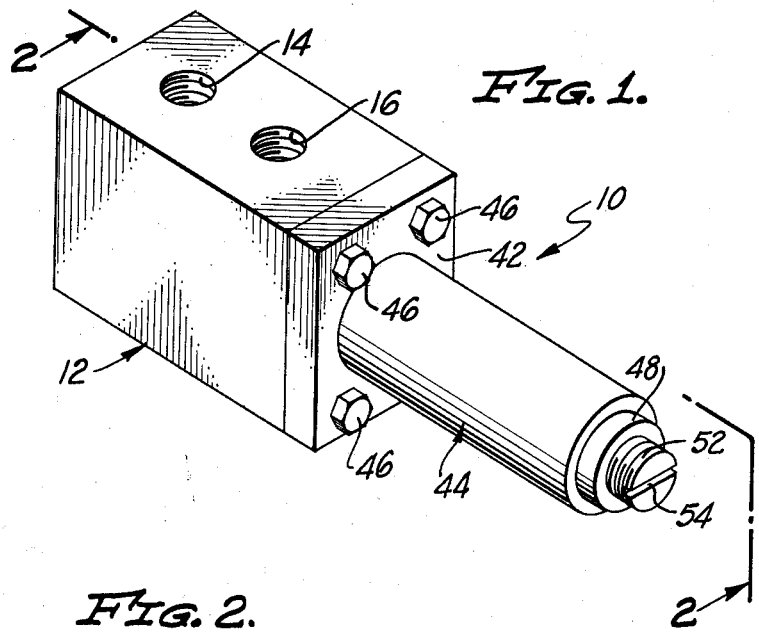
FIG. 1 is a perspective view of a relief valve of this invention.

The accompanying drawing is primarily intended so as to clearly illustrate the nature and construction of a presently preferred embodiment of the present invention. Those skilled in the art to which this invention pertains will realize, however, that hydraulic relief valves can be constructed differently than the valve shown so as to achieve the benefits of this invention. Thus, for example, various changes in dimensions, assembly methods or the like can be made in the structure shown through the exercise of routine engineering skill without departing from the actual nature of this invention as set forth in this specification.

As an aid to understanding this invention it can be stated in essentially summary form that it concerns hydraulic relief valves, each of which includes a valve housing having pressure and return passages connected by means of a valve passage containing a valve seat. With a relief valve of this invention a valve body or plunger is mounted so as to be capable of being moved with respect to this valve seat in order to control the flow of fluid from the pressure passage to the return passage, and spring means are utilized in order to bias this plunger toward the valve seat. It is important that in a hydraulic relief valve of this invention means are provided for applying hydraulic pressure from the pressure passage against a portion of the plunger or valve body remote from the pressure passage in order to stabilize the plunger or body against movement of the type which occurs in prior related structures.

The actual details of this invention are more fully explained by referring directly to the accompanying drawing. Here there is shown a complete relief valve 10 of the present invention which includes a block-like valve housing 12, having a pressure passage 14 formed in it. A return passage 16 is also formed within the housing so as to be parallel to the pressure passage 14; these passages 14 and 16 are intersected by means of a cross bore 18 located at a right angle to them.

In the valve 10 a small bushing 20 is secured within the interior of the bore 18 between the passages 14 and 16 in order to define a valve passage 22 ending between the passages 14 and 16. This bushing 20 may, of course, be secured in place in a number of different ways. Satisfactory results can be achieved by press-fitting it within the bore 18. The extremity 24 of the bushing 20 adjacent to the return passage 16 is preferably beveled or tapered as shown so as to have the shape of a frustrum of a right circular cone in which the walls are located at a 45° angle to the axis of the cone. This construction is designed so that the end 24 is capable of being utilized as a valve seat. For convenience the end 24 is hereafter designated as a valve seat.

Figure 2:
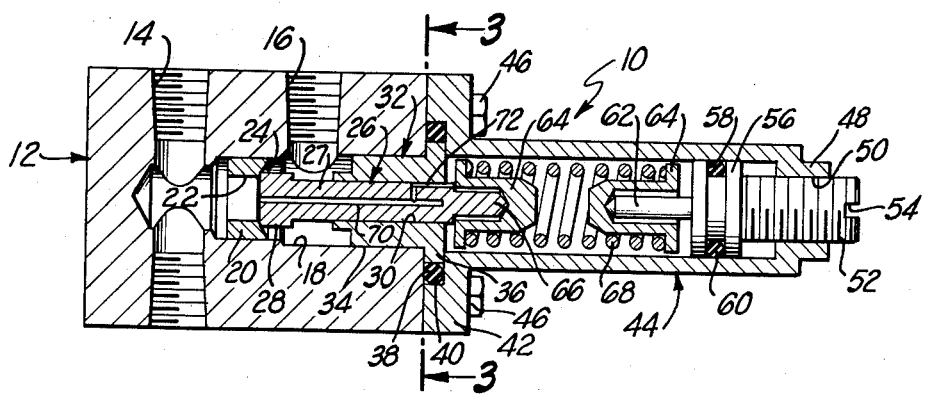
FIG. 2 is a cross-sectional view taken at line 2—2 of FIG. 1.
Figure 3:
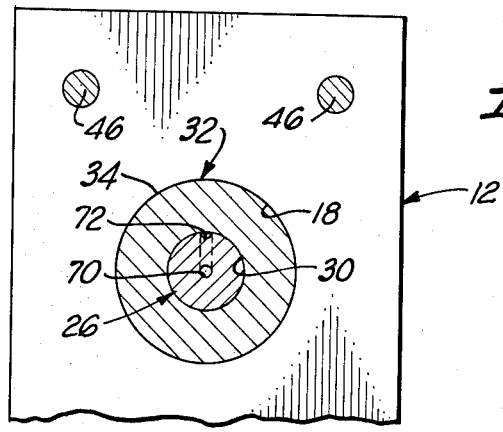
FIG. 3 is a cross-sectional view taken at line 3—3 of FIG. 2.

In the valve 10 an elongated, rod-like plunger 26 is provided with an enlarged cylindrical end 28 which is adapted to be held against the valve seat 24 as hereinafter described in order to achieve a valve action between the passages 14 and 16. If desired the end 28 or even the entire plunger 26 can be termed a valve body. The center portion 27 of the plunger 26 is of a cylindrical shape and has a smaller diameter than the end 28. This portion 27 of the plunger 26 fits closely against the wall of a correspondingly shaped hole 30 formed in a guide 32. This guide 32 includes a cylindrical exterior wall 34 which fits closely against the interior of the bore 18 and a terminal flange 36 which fits against the exterior of the housing 12. From an examination of FIG. 2 of the drawing it will be seen that the plunger 26 extends from the guide 32 a sufficient distance so that the end 28 is capable of being moved back and forth with respect to the valve seat 24.

Preferably both the flange 36 and wall 34 fit closely against the adjacent parts of the housing 12 so as to form a seal against leakage. At the present time it is preferred to press-fit the guide 32 within the bore 18 so that the wall 34 is secured within this bore. A conventional elastomeric O-ring 38 is preferably located around the periphery of the flange 36 for sealing purposes. The O-ring 38 is normally maintained against the exterior of the housing 12 within a groove 40 on a flange 42 attached to an extremity of a cylinder 44 serving to enclose the extremity of the plunger 26 remote from the valve seat 24 so as to retain hydraulic fluid. This flange 42 fits against the housing 12 and is secured to it by means of bolts 46.

The extremity 48 of the cylinder 44 remote from the housing 12 is provided with a centrally located threaded opening 50 which carries a threaded adjustment shaft 52. This shaft 52 is provided with an end slot 54 for adjustment purposes and carries within the interior of the cylinder 44 an enlarged piston-like cylindrical end 56. A groove 58 is preferably located around the periphery of this end 56; another conventional elastomeric O-ring 60 used for sealing purposes is located in the groove 58. This end 56 also carries a pointed rod 62.

The rod 62 in turn carries a hat-like conventional spring retainer 64. Another such retainer 64 is provided on a pointed extremity 66 of the plunger 26 which extends through the guide 32 into the interior of the cylinder 44. A conventional coil spring 68 is located between the two spring retainers 64 so as to be balanced against them in an established manner. The pressure exerted upon the plunger 26 by the spring 68 may be easily varied by turning the shaft 52 in an obvious manner.

In the valve 10 hydraulic fluid from the pressure passage 14 is conveyed into the interior of the cylinder 44 through passages 70 leading through the flange 26 to a peripherial groove 72 which extends along one side of part of the exterior of the central portion 27 of the plunger 26 within the guide 32. With this construction this groove 72 leads beyond the hold 30 within the guide 32 into the end of the cylinder 44 adjacent to the pointed end 66.

During the utilization of the complete valve 10 hydraulic fluid under pressure is, of course, conveyed into the pressure passage 14 by appropriate conduit means (not shown) of a conventional character. Hydraulic fluid from within the pressure passage 14 is conveyed through the passages 70 and then along the groove 72 into the interior of the cylinder 44. As a result of this construction the plunger 26 in the valve 10 is subjected to hydraulic forces at both of its ends. Thus, the end 28 of the plunger 26 which is seated against the valve seat 24 is subjected to pressure from the fluid within the pressure passage 14. Similarly, hydraulic fluid acts against the extremity of the plunger 26 exposed generally within the cylinder 44. As a result of this when the valve 10 is closed, it is held closed by the force exerted by hydraulic fluid against the plunger 26 within the cylinder 44 and by the pressure exerted by the spring 68 and these two forces are opposed by the hydraulic pressure on the exposed face of the end 28 opposite the pressure passage 14.

When the pressure within this pressure passage 14 increases sufficiently so that the force exerted upon the exposed end 28 of the plunger 26 exceeds the forces exerted against the extremity of the plunger 26 within the cylinder 44 this end 28 is moved away from the valve seat 24, permitting fluid to move from the pressure passage 14 to the return passage 16. The particular shapes employed for the valve seat 24 and the end 28 are considered to be important in reducing the viscous pressure forces and the resulting pressure drop between the passages 14 and 16 when the plunger 26 is in this open position. The plunger 26 will, of course, remain in this open position until such time as the pressure within the pressure passage 14 drops to a value at which the force of the spring 68 and the pressure exerted against the extremity of the plunger 26 within the cylinder 44 by hydraulic fluid exceed the forces against the end 28 of the plunger 26. The end 28 will then be moved to a closed position against the valve seat 24.

In the valve 10 damping or stabilizing forces tending to control or "stabilize" the plunger 26 are derived in two different ways. In this valve the groove 72 serves in this regard by providing an area at the side of the plunger 26 within the hole 30 along which hydraulic fluid from within the pressure passage 14 operates so as to provide forces which are not directed in the direction of linear movement of this plunger. As a consequence of this the forces exerted by hydraulic fluid within the groove 72 tend to "side load" the plunger 26, preventing extremely rapid movement of the plunger. This type of side loading is particularly effective in case surges of high pressure are received within the pressure passage 14 since in a short time interval the pressure from such surges cannot be distributed around the plunger 26. With this construction preferably the groove 72 is relatively small and long so as to cause a significant pressure drop during such surges of pressure. The groove 72 and the passages 70 also act as damping orifices so as to aid in "smoothing out" pressure surges tending to affect the movement of the plunger 26.

Such movement is also controlled or "stabilized" in the construction shown by virtue of the fact that hydraulic pressure from the pressure passage 14 is supplied to both extremities of the plunger 26. In the construction shown the end 28 is larger than the other extremity of this plunger 26, and as a consequence of this pressure of hydraulic fluid within the pressure passage 14 tending to move the plunger 26 to an open position with respect to the valve seat 24 normally exceeds the pressure which tends to hold this plunger in a closed position exerted by hydraulic fluid.

I claim:
1. A relief valve which includes:
   a housing;
   a pressure passage located within said housing;
   a return passage located within said housing;
   a valve passage connecting said pressure and said return passages;
   a bore extending from said valve passage at the extremity thereof remote from said pressure passage;
   valve seat means located within said valve passage facing said bore;
   plunger means removably mounted within said bore, said plunger means having a first end located within said valve passage and a second end located adjacent to the extremity of said bore remote from said valve passage, said first end of said plunger means being capable of fitting against said valve seat so as to form a seal therewith;
   enclosing means for enclosing the extremity of said bore remote from said valve passage and said second end of said plunger means secured to said housing;
   damping passage means for conveying hydraulic fluid under pressure from said pressure passage to within the space defined by said enclosing means adjacent to said second end, said damping passage means including a groove located between adjacent surfaces of said plunger means and said bore said groove being located along one side of said plunger means and
   spring means engaging said plunger means so as to bias said plunger means against said valve seat.
2. A relief valve which includes:
   a housing;

a pressure passage located within said housing;

a return passage located within said housing;

a valve passage connecting said pressure and said return passages;

a bore extending from said valve passage at the extremity thereof remote from said pressure passage;

valve seat means located within said valve passage facing said bore;

plunger means removably mounted within said bore, said plunger means having a first end located within said valve passage and a second end located adjacent to the extremity of said bore remote from said valve passage, said first end of said plunger means being capable of fitting against said valve seat so as to form a seal therewith;

enclosing means for enclosing the extremity of said bore remote from said valve passage and said second end of said plunger means secured to said housing;

damping passage means for conveying hydraulic fluid under pressure from said pressure passage to within the space defined by said enclosing means adjacent to said second end, said damping passage means including a groove located on one side of the exterior of said plunger means opposite said bore, said groove leading to the interior of said enclosing means, and passages leading to said groove through the interior of said plunger means from said first end of said plunger means;

spring means located within said enclosing means and engaging said second end of said plunger means, said spring means providing a force tending to force said plunger means against said valve seat; and means for varying the force exerted by said spring means against said plunger means operatively associated with said spring means and said enclosing means.

References Cited in the file of this patent

UNITED STATES PATENTS

| | | |
|---|---|---|
| 965,052 | Wainright | July 19, 1910 |
| 2,323,021 | Ernst | June 29, 1943 |
| 2,704,549 | Strnad | Mar. 22, 1955 |